United States Patent [19] [15] 3,679,672
Yamamoto et al. [45] July 25, 1972

[54] NOVEL ESTER OF 3-INDOLYLALIPHATIC ACID DERIVATIVE

[72] Inventors: Hisao Yamamoto, Nishinoyo; Tadashi Okamoto, Ashiya-shi; Tsuyoshi Kobayashi, Minoo-shi, all of Japan

[73] Assignee: Sumitomo Chemical Company, Ltd., Higashi-ku, Osaka, Japan

[22] Filed: Sept. 9, 1969

[21] Appl. No.: 856,484

[30] Foreign Application Priority Data

Sept. 10, 1968 Japan.................................43/65456
Sept. 10, 1968 Japan.................................43/65459
Nov. 14, 1968 Japan.................................43/83367
Nov. 14, 1968 Japan.................................43/83368
Feb. 10, 1969 Japan..................................44/9857

[52] U.S. Cl............................260/240 J, 424/248, 424/267, 424/274, 260/247.2 A, 260/293.71, 260/326.14 A, 260/326.15 A
[51] Int. Cl.............................................C07d 27/56
[58] Field of Search.............260/240 J, 326.13 A, 326.14 A, 260/247.2 A, 293.71

[56] References Cited

UNITED STATES PATENTS 3,316,260  4/1967  Shen.....................260/247.2
3,342,834  9/1967  Shen.....................260/326.12
3,535,334  10/1970 Yamamoto et al..........260/240 J X

FOREIGN PATENTS OR APPLICATIONS 698,098  5/1967  Belgium.................260/240

Primary Examiner—John D. Randolph
Attorney—Stevens, Davis, Miller & Mosher

[57] ABSTRACT

Novel 3-indolylacetate derivatives and salts thereof useful for anti-inflammatory agents which have the formula,

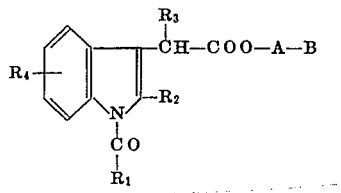

wherein $R_1$ is styryl, phenyl, halogenophenyl or methylenedioxyphenyl; $R_2$ and $R_3$ are independently hydrogen, methyl or ethyl; $R_4$ is hydrogen, halogen, $C_1$-$C_4$ alkyl or $C_1$-$C_4$ alkoxy; A is a group of the formula,

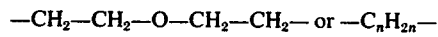

wherein $n$ is an integer of 1–6; and B is amino, $C_1$-$C_4$ alkylamino, di $C_1$-$C_4$ alkylamino, morpholino, benzylpiperazino, piperazino, etc. The 3-indolylacetate derivatives are produced by reacting a 3-indolylacetic acid derivative of the formula,

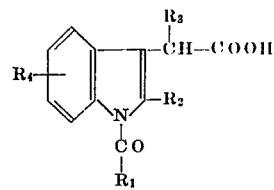

or a reactive derivative thereof with an alcohol derivative of the formula,

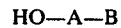

or its reactive ester derivative, or reacting an $N^1$-acyl phenylhydrazine derivative of the formula,

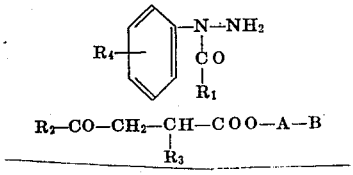

or its salt or its hydrazone derivative with a keto ester derivative of the formula,

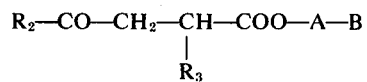

or its salt, in which formulas, $R_1$, $R_2$, $R_3$, $R_4$, A and B have the same meanings as defined above.

3 Claims, No Drawings

NOVEL ESTER OF 3-INDOLYLALIPHATIC ACID DERIVATIVE

This invention relates to novel 3-indolylacetate derivatives and salts thereof useful for anti-inflammatory agents. More particularly, the invention pertains to 3-indolylacetate derivatives represented by the formula (I),

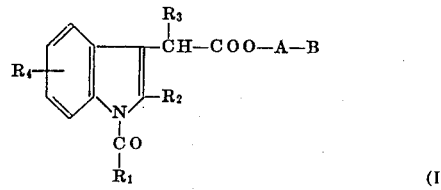

(I)

wherein $R_1$ signifies a styryl group, a phenyl group, a halogen-substituted phenyl group or a methylenedioxy phenyl group; $R_2$ and $R_3$ signify a hydrogen atom or a $C_1$-$C_2$ alkyl $R_4$ signifies a hydrogen atom, a halogen atom, a $C_1$-$C_4$ alkyl group or a $C_1$-$C_4$ alkoxy group; A signifies $-CH_2-CH_2-O-CH_2-CH_2-$ or $-C_nH_{2n}-$ (wherein $n$ signifies an integer of 1-6); B signifies an amino group, a $C_1$-$C_4$ alkylamino group, a di-$C_1$-$C_4$ alkylamino group, or an unsubstituted or $C_1$-$C_4$ alkyl-, aralkyl-, phenyl- or aralkenyl-substituted five or six membered heterocyclic ring containing one or two nitrogen atoms, and salts thereof, and processes for producing the same.

Hitherto, it has been well known that some indolylaliphatic acid derivatives are useful for anti-inflammatory agents. The present inventors have studied concerning anti-inflammatory actions of various indolylaliphatic acid derivatives, and as the results, have found that novel 3-indolylacetate derivatives of the formula (I) are excellent anti-inflammatory agents in the fact that they possess very low toxicities though they have strong anti-inflammatory activities.

Accordingly, one object of the present invention is to provide novel 3-indolylacetate derivatives useful for anti-inflammatory agents.

Another object of the present invention is to provide processes for producing such novel 3-indolylacetate derivatives.

A further object of the present invention is to provide novel pharmaceutical composition containing such novel 3-indolylacetate derivative as active ingredient.

Other objects and merits of the present invention will be apparent from the following description.

In order to accomplish these objects, the present invention provides novel 3-indolylacetate derivatives of the formula (I) or salts thereof.

The present invention further provides processes for producing 3-indolylacetate derivatives of the formula (I) or salts thereof, which comprises a. contacting a 3-indolylacetic acid derivative represented by the formula,

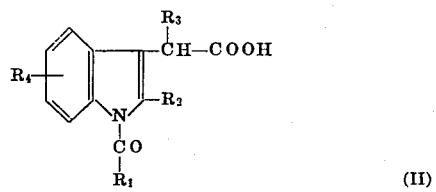

(II)

wherein $R_1$, $R_2$, $R_3$ and $R_4$ have the same meanings as defined above, or a reactive derivative thereof with an alcohol derivative represented by the formula, $$HO-A-B \qquad (III)$$

wherein A and B have the same meanings as defined above or its reactive ester derivative, and further, if necessary, contacting the resulting 3-indolylacetate derivative with an acid or alkyl halide, or b. contacting an $N^1$-acyl phenylhydrazine derivative represented by the formula,

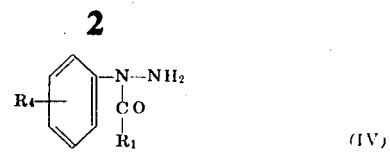

(IV)

wherein $R_1$ and $R_4$ have the same meanings as defined above, or its salt or its hydrazone derivative with a keto ester derivative represented by the formula,

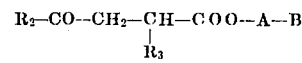

wherein $R_2$, $R_3$, A and B have the same meanings as defined above, or its salt, and further, if necessary, contacting the resulting 3-indolyacetate derivative with an acid or alkyl halide.

Furthermore the present invention provides novel pharmaceutical composition containing 3-indolylacetate derivative of the formula (I) as an active ingredient.

In the compound represented by the aforesaid formula (I), $-C_nH_{2n}-$ includes straight or branched hydrocarbon chain, and B includes $-NH_2$, $-NH-CH_3$, $-NH-C_2H_5$, $-NH-C_3H_7$, $-NH-C_4H_9$, $-N(CH_3)_2$, $-N(C_2H_5)_2$, $-N(C_3H_7)_2$, $-N(C_4H_9)_2$ and the aforesaid five or six membered heterocyclic rings containing one or two nitrogen atoms include, pyridine, piperidine, piperazine, pyrroline, pyrrolidine, pyrrole, pyrazole, imidazole, oxazole, morpholine and the like.

All of the 3-indolylacetate derivatives represented by the formula (I) and salts thereof are novel compounds and have not been described in any literature. These compounds have excellent antipyretic, analgesic and anti-inflammatory activities.

In the present invention, novel 3-indolylacetate derivatives of the aforesaid formula (I) and salts thereof are obtained easily in high yield by condensing corresponding 3-indolylacetic acid derivatives represented by the formula (II), or reactive derivatives thereof with an alcohol derivative represented by the formula (III), or its reactive ester derivative.

Reactive derivatives of 3-indolylacetic acid derivatives include, for instance, acid halide such as acid chloride or acid bromide, acid anhydride, ester derivative such as methyl ester, ethyl ester, tosyl ester, benzyl ester or p-nitrophenyl ester, acid metal salt, and the like.

More particularly, 3-indolylacetate derivatives of the formula (I) are obtained by reacting the corresponding 3-indolylacetic acid derivatives of the formula (II) or its reactive derivative (for example, acid halide, ester, acid anhydride and the like) with alcohols of the formula (III) or by reacting the metal salts of corresponding 3-indolylacetic acid derivatives of the formula (II) with reactive esters of alcohols of the formula (III) (for example, alkyl halide, alkyl sulfate, alkyl arylsulfonate and the like).

These reactions are carried out in the presence or absence of a condensing agent, such as sodium hydroxide, potassium hydroxide, sodium carbonate, pyridine, triethylamine or dicyclohexylcarbodiimide, and the presence of these condensing agents is preferable in general.

These reactions are usually carried out in the presence of a solvent such as ether, tetrahydrofuran, dioxane, acetone, benzene, toluene, chloroform, pyridine, dimethylformamide or the like, and the employment of a solvent is preferable in the reaction in general.

These reactions are carried out at room temperature, in general, but if desired, the reactions may be controlled by heating or cooling, through the heating and cooling are not always necessary.

3-Indolylacetate derivatives represented by the formula (I) are also obtained by reacting $N^1$-acyl phenyl hydrazine derivative represented by the formula (IV), or its salt or its hydrazone derivative with keto ester derivative represented by the formula (V), or its salt.

N¹-Acyl phenylhydrazine derivative of the formula (IV) may be also used as an acid salt such as hydrochloride, hydrobromide or phosphate.

As a hydrazone derivative of the formula (IV), acetaldehyde hydrazone, benzaldehyde hydrazone, or diphenylketone hydrazone is commercially preferable in the reaction.

The reaction is carried out in the presence or absence of a solvent with a condensing agent. The solvent includes, for example, acetic acid, propionic acid, benzene, toluene, xylene, cyclohexane, dioxane, isopropylether, butyl alcohol, ethyleneglycol and the like. Condensing agents such as, for example, hydrochloric acid, sulfuric acid, zinc chloride, polyphosphoric acid, acetic acid, propionic acid and the like are preferably employed. The reaction is preferably carried out at 60°–200° C.

In the present invention, acid salts of 3-indolylacetate derivatives of the formula (I) are produced by treating the 3-indolylacetate derivatives of the formula (I) with a mineral acid such as hydrochloric acid, hydrobromic acid, sulfuric acid, nitric acid, phosphoric acid or the like, or with an organic acid such as maleic acid, tartaric acid, fumaric acid, succinic acid, citric acid, acetic acid or the like. And the quaternary ammonium salts can be prepared by reaction of the free base with an alkyl halide, such as methyl bromide, methyl iodide or ethyl iodide.

According to the process of the present invention, there are produced 3-indolylacetate derivatives and salts thereof, such as shown below.

β-N,N-Dimethylaminoethyl 1-(p-chlorobenzoyl)-2-methyl-5-methoxy-3-indolylacetate.
β-N,N-Diethylaminoethyl 1-(p-chlorobenzoyl)-2-methyl-5-methoxy-3-indolylacetate.
β-N,N-Diethylaminoethyl 1-cinnamoyl-2-methyl-5-methoxy-3-indolylacetate.
β-N,N-Dimethylaminoethyl 1-cinnamoyl-2-methyl-5-methoxy-3-indolylacetate.
β-N,N-Dimethylaminoethyl 1-(3',4'-methylenedioxybenzoyl)-2-methyl-5-methoxy-3-indolylacetate.
βN,N-Diethylaminoethyl 1-(3',4'-methylenedioxybenzoyl)-2-methyl-5-methoxy-3-indolylacetate.
γ-N,N-Dimethylaminopropyl 1-(p-chlorobenzoyl)-2-methyl-5-methoxy-3-indolylacetate.
γ-N-Methylaminopropyl 1-(p-chlorobenzoyl)-2-methyl-5-methoxy-3-indolylacetate.
β-N,N-Dimethylaminoethyl 1-(p-chlorobenzoyl)-2,5-dimethyl-3-indoylacetate.
β-N,N-Dimethylaminoethyl 1-(p-chlorobenzoyl)-2-methyl-5-chloro-3-indolylacetate.
β-N,N-Dimethylaminoethyl α-(1-cinnamoyl-2-methyl-5-methoxy-3-indoyl)-propionate.
β-N-Methylaminoethyl 1-cinnamoyl-2-methyl-5-methoxy-3-indolylacetate.
β-N,N-Dimethylaminoethyl 1-cinnamoyl-2-methyl-5-chloro-3-indolylacetate.
γ-Piperidinopropyl 1-(p-chlorobenzoyl)-2-methyl-5-methoxy-3-indolylacetate.
γ-Piperidinopropyl 1-cinnamoyl-2-methyl-5-methoxy-3-indolylacetate.
γ-Piperidinopropyl 1-(3',4'-methylenedioxybenzoyl)-2-methyl-5-methoxy-3-indolylacetate.
β-Piperidinoethyl 1-(p-chlorobenzoyl)-2-methyl-5-methoxy-3-indolylacetate.
β-Piperidinoethyl 1-cinnamoyl-2-methyl-5-methoxy-3-indolylacetate.
β-Piperidinoethyl 1-(3',4'-methylenedioxybenzoyl)-2-methyl-5-methoxy-3-indolylacetate.
β-[2'-(N-Methylpiperidyl)] ethyl 1-(p-chlorobenzoyl)-2-methyl-5-methoxy-3-indolylacetate.
β[2'-(N-Methylpiperidyl)] ethyl 1-cinnamoyl-2-methyl-5-methoxy-3-indolylacetate.
β-[2'-(N-Methylpiperidyl)] ethyl 1-(3'',4''-methylenedioxybenzoyl)-2-methyl-5-methoxy-3-indolylacetate.
γ-Morpholinopropyl 1-(p-chlorobenzoyl)-2-methyl-5-methoxy-3-indolylacetate.
γ-Morpholinopropyl 1-cinnamoyl-2-methyl-5-methoxy-3-indolylacetate.
γ-Morpholinopropyl 1-(3',4'-methylenedioxybenzoyl)-2-methyl-5-methoxy-3-indolylacetate.
γ-[2'-(N-Methylpiperidyl)] propyl 1-cinnamoyl-2-methyl-5-methoxy-3-indolylacetate.
γ-[2'-(N-Methylpiperidyl)] propyl 1-(3'',4''-methylenedioxybenzoyl)-2-methyl-5-methoxy-3-indolylacetate.
α-Morpholinoethyl 1-cinnamoyl-2-methyl-5-methoxy-3-indolylacetate.
γ-Piperidinopropyl 1-(p-chlorobenzoyl)-2,5-dimethyl-3-indolylacetate.
β-Morpholinoethyl 1-(p-chlorobenzoyl)-2-methyl-5-chloro-3-indolylacetate.
β-[2'-(N-Methylpiperidyl)] ethyl π-(1-cinnamoyl-2-methyl-5-methoxy-3-indolyl)-propionate.
β-(N⁴-Benzylpiperazino)-ethyl 1-cinnamoyl-2-methyl-5-methoxy-3-indolylacetate.
β-Morpholinoethyl 1-benzoyl-2-methyl-5-chloro-3-indolylacetate.
β-(N⁴-Methylpiperazino)-ethyl 1-cinnamoyl-2-methyl-5-methoxy-3-indolylacetate.
β-Morpholinoethyl 1-(p-chlorobenzoyl)-2-methyl-5-methoxy-3-indolylacetate.
β-(N⁴-Phenylpiperazino)-ethyl 1-cinnamoyl-2-methyl-5-methoxy-3-indolylacetate.
γ -Pirrolizinopropyl 1-cinnamoyl-2-methyl-5-methoxy-3-indolylacetate.
β-(N⁴-Cinnamoylpiperazino)-ethyl 1-cinnamoyl-2-methyl-5-methoxy-3-indolacetate.
ω-Morpholinohexyl 1-(p-chlorobenzoyl)-2-methyl-5-methoxy-3-indolylacetate.
β-Morpholinoethyl 1-cinnamoyl-2-methyl-5-methoxy-3-indolylacetate.
Diethylaminoethoxyethyl 1-(p-chlorobenzoyl)-2-methyl-5-methoxy-3-indolylacetate.
Diethylaminoethoxyethyl 1-cinnamoyl-2-methyl-5-methoxy-3-indolylacetate.
Diethylaminoethyoxyethyl 1-(3'
Diethylaminoethoxyethyl -methylenedioxybenzoyl)-2-methyl-5-methoxy-3-indolylacetate.
Dimethylaminoethoxyethyl 1-(p-chlorobenzoyl-2-methyl-5-methoxy-3-indolylacetate.
Dimethylaminoethoxyethyl 1-cinnamoyl-2-methyl-5-methoxy-3-indolylacetate.
Dimethylaminoethoxyethyl 1-(3',4'-methylenedioxybenzoyl)-2-methyl-5-methoxy-3-indolylacetate.
Dimethylaminoethoxyethyl 1-(p-chlorobenzoyl)-2,5-dimethyl-3-indolylacetate.
Diethylaminoethoxyethyl α-(1-cinnamoyl-2-methyl-5-methoxy-3-indolyl)propionate.
Diethylaminoethoxyethyl 1-benzoyl-2-methyl-5-chloro-3-indolylacetate.
and their hydrochlorides, hydrobromides, sulfates, phosphates, maleates, tartarates, fumarates, succinates, citrates, acetates, methyl bromides and methyl iodides.

These present compounds possess a high degree of anti-inflammatory activity and hence are of value in mitigating the symptoms associated with rheumatic and other inflammatory conditions as well as preventing or suppressing the occurrence of inflammation. These present compounds exhibit lower toxicities than the corresponding parent compounds, and seldom cause occult bleeding in feces in animal tests at high dose level, even at 400 mg/kg per os. In spite of the remarkably low toxicity, these present compounds show notably excellent inhibitions of carrageenin-induced foot edema of rats, so the therapeutic ratios (lethal dose/effective dose) of these compounds are much greater than the first class anti-inflammatory drugs, such as indomethacin, phenylbutazone, etc. (Table 1).

TABLE 1. Anti-inflammatory activity[a]

| Compound Name | Dose[b] mg/kg | Inhibition[c] of edema | Toxicity[d] |
| --- | --- | --- | --- |

| | | | |
|---|---|---|---|
| β-Morpholinoethyl 1-cinnamoyl-2-methyl-5-methoxy-3-indolyl-acetate hydrochloride | 5 | 39.2 | − |
| | 20 | 61.5 | − |
| | 50 | 72.8 | − |
| | 200 | 74.6 | + |
| β-Piperidinoethyl 1-cinnamoyl-2-methyl-5-methoxy-3-indolyl-acetate hydrochloride | 5 | 40.6 | − |
| | 20 | 44.0 | − |
| | 50 | 74.1 | − |
| | 200 | 78.1 | + |
| γ-Morpholinopropyl-1-cinnamoyl-2-methyl-5-methoxy-3-indolyl-acetate hydrochloride | 5 | 34.8 | − |
| | 10 | 46.1 | − |
| | 20 | 48.0 | − |
| | 50 | 61.3 | − |
| | 200 | 63.7 | + |
| β-(N$^4$-Benzylpiperazino)-ethyl 1-cinnamoyl-2-methyl-5-methoxy-3-indolylacetate dihydrochloride | 5 | 23.3 | − |
| | 20 | 55.3 | − |
| | 200 | 74.3 | − |
| | 400 | 72.9 | − |
| β-Morpholinoethyl 1-(3',4'-methylenedioxybenzoyl)-2-methyl-5-methoxy-3-indolyl-acetate hydrochloride | 20 | 44.9 | − |
| | 50 | 42.8 | − |
| | 200 | 69.4 | − |
| | 400 | 69.4 | + |
| β-Morpholinoethyl 1-(p-chlorobenzoyl)-2-methyl-5-methoxy-3-indolylacetate hydrochloride | 5 | 38.6 | − |
| | 10 | 70.9 | − |
| | 50 | 74.5 | + |
| β-(N,N-Dimethylamino)-ethyl 1-(3',4'-methylene dioxybenzoyl)-2-methyl-5-methoxy-3-indolylacetate hydrochloride | 20 | 28.8 | − |
| | 50 | 47.5 | − |
| | 200 | 63.1 | − |
| | 400 | 60.9 | − |
| Indomethacin (known compound) | 5 | 39.8 | − |
| | 10 | 56.6 | ++ |
| | 20 | 57.6 | +++ |
| Phenylbutazone (known compound) | 50 | 30.4 | − |
| | 100 | 40.6 | − |
| | 200 | 51.2 | ++ |

$^{(a)}$ Anti-inflammatory activity was evaluated by the inhibitory effect on rat hind paw edema induced by injection of 0.005 ml. of 1 percent carrageenin in sterile 0.9 percent NaCl
$^{(b)}$ Test compounds were administrated orally 1 hour before the injection of carrageenin. At each dose level, three to six rats were used.
$^{(c)}$ Foot volume was measured at 3, 4 and 5 hours after the carrageenin injection and the mean of these measurements was calculated in each rat. Inhibition of edema is expressed as $(1 - T/C) \times 100$, where T is the mean edema volume of treated group and C is the mean volume of the control group.
$^{(d)}$; no blood in feces, body weight gain normal.
+; no blood in feces, body weight decreased.
++; blood in feces, body weight decreased.
+++; symptoms of ++, but some animals died during the 4 days after administration.

They are preferably administrated by an oral route. The pharmaceutically acceptable acid-addition salts are preferred. The compounds of the invention can be combined with either a solid or liquid carrier or diluent and made available in varying amounts in such conventional pharmaceutical forms as tablets, dragees, capsules, powders, suspension and solutions.

The present invention will be illustrated in further detail below with reference to examples, but the examples are merely illustrative and the invention is not limited only to these.

Example 1

To a solution of 10.5 g. of 1-cinnamoyl-2-methyl-5-methoxy-3-indoyl acetic acid in 100 ml. of tetrahydrofuran and 3.1 g. of triethylamine is added 3.3 g. of ethyl chloroformate at 0° C. After the reaction mixture is stirred for 1 hr. at 0° C., 3.5 g. of β-N,N-dimethylaminoethanol is added to the reaction mixture. The reaction mixture is stirred under reflux for 2 hours and the solvent is removed under reduced pressure. Water is added to he residue and the mixture is extracted with benzene. The benzene layer is washed with water and dried over sodium sulfate. The solvent is removed under reduced pressure to give 9.5 g. of β-N,N-dimethylaminoethyl 1-cinnamoyl-2-methyl-5-methoxy-3-indolylacetate as a yellow oil. Gaseous hydrogen chloride is introduced to a solution of β-N,N-dimethylaminoethyl 1-cinnamoyl-2-methyl-5-methoxy-3-indolylacetate in ether at 5° C. Deposited crystals are collected by filtration and recrystallized from ethanol to give β-N,N-dimethylaminoethyl 1-cinnamoyl-2-methyl-5-methoxy-3-indolylacetate hydrochloride. Mp. 194°–194.5° C.

Similarly, methyl iodide is added to an ether solution of β-N,N-dimethylaminoethyl 1-cinnamoyl-2-methyl-5-methoxy-3-indolylacetate to give β-N,N-dimethylaminomethyl 1-cinnamoyl-2-methyl-5-methoxy-3-indolylacetate methyl iodide. Recrystallization from ethanol give yellow needles having a melting point of 219° C.

According to the procedure mentioned above, there are obtained following compounds β-N,N-Dimethylaminoethyl 1-(3',4'-methylenedioxybenzoyl)-2-methyl-5-methoxy-3-indolylacetate hydrochloride. Mp. 137°–138° C.

β-N,N-Dimethylaminoethyl 1-(3',4'-methylenedioxybenzoyl)-2-methyl-5-methoxy-3-indolylacetate methyl iodide. Mp. 190°–192° C.

γ-N,N-Dimethylaminopropyl 1-cinnamoyl-2-methyl-5-methoxy-3-indolylacetate hydrochloride. Mp. 156°–157° C.

γ-Morpholinopropyl 1-cinnamoyl-2-methyl-5-methoxy-3-indolylacetate hydrochloride. Mp. 166°–167° C.

β-Dimethylaminopropyl 1-cinnamoyl-2-methyl-5-methoxy-3-indolylacetate hydrochloride. Mp. 170°–172° C.

β-Morpholinoethyl 1-cinnamoyl-2-methyl-5-methoxy-3-indolylacetate hydrochloride. Mp. 187°–188° C.

β-(N$^4$-Benzyl-piperazino)ethyl 1-cinnamoyl-2-methyl-5-methoxy-3-indolylacetate dihydrochloride. Mp. 188°–189° C.

β-Piperidinoethyl 1-cinnamoyl-2-methyl-5-methoxy-3-indolylacetate hydrochloride. Mp. 164°–165° C.

β-Piperidinoethyl 1-(p-chlorobenzoyl)-2-methyl-5-methoxy-3-indolylacetate hydrochloride. Mp. 210°–211° C.

β-Morpholinoethyl 1-(3',4'-methylenedioxybenzoyl)-2-methyl-5-methoxy-3-indolylacetate hydrochloride. Mp. 120° C. (dec.)

β-Morpholinoethyl 1-(p-chlorobenzoyl)-2-methyl-5-methoxy-3-indolylacetate hydrochloride. Mp. 201°–202° C.

Example 2

A solution of 7 g. of 1-cinnamoyl-2-methyl-5-methoxy-3-indoyl acetic acid in 30 ml. of dimethylformamide is added to a mixture of 0.5 g. of sodium hydride and 10 ml. of dimethylformamide at 5° C. and the reaction mixture is stirred for 0.5 hour. To the reaction mixture is added 2.8 g. of β-N,N-diethylaminoethyl chloride at 5° C. and the reaction mixture is stirred for 4 hours at 30° C. The reaction mixture is poured into water and extracted with benzene. The benzene layer is washed with water and dried over sodium sulfate. The solvent is removed under reduced pressure to give 5.5 g. of β-N,N-diethylaminoethyl 1-cinnamoyl-2-methyl-5-methoxy-3-indolylacetate as a yellow oil. Equimolar amount of methyl iodide is added to a solution of β-N,N-diethylaminoethyl 1-cinnamoyl-2-methyl-5-methoxy-3-indolylacetate in ether at 10° C. Deposited crystals are collected by filtration and recrystallized from ethanol to give β-N,N-diethylaminoethyl 1-cinnamoyl-2-methyl-5-methoxy-3-indolylacetate methyliodide. Mp. 198°–198.5° C.

Similarly, gaseous hydrogen chloride is introduced to a solution of β-N,N-diethylaminoethyl 1-cinnamoyl-2-methyl-5-methoxy-3-indolylacetate in ether, and then β-N,N-diethylaminoethyl 1-cinnamoyl-2-methyl-5-methoxy-3-indolylacetate hydrochloride is given. Recrystallization from ethanol gives yellow crystals having a melting point of 133°–134° C.

According to the procedure mentioned above, there are obtained the following compounds.

β-N,N-Dimethylaminoethyl 1-(3',4'-methylenedioxybenzoyl)-2-methyl-5-methoxy-3-indolylacetate hydrochloride. Mp. 137°–138° C.

β-N,N-Dimethylaminoethyl 1-(3',4'-methylenedioxybenzoyl)-2-methyl-5-methoxy-3-indolylacetate methyl iodide. Mp. 190°–192° C.

γ-N,N-Dimethylaminopropyl 1-cinnamoyl-2-methyl-5-methoxy-3-indolylacetate hydrochloride. Mp. 156°–157° C.

γ-Morpholinopropyl 1-cinnamoyl-2-methyl-5-methoxy-3-indolylacetate hydrochloride. Mp. 166°–167° C.

β-Dimethylaminopropyl 1-cinnamoyl-2-methyl-5-methoxy-3-indolylacetate hydrochloride. Mp. 170°–172° C.

β-Morpholinoethyl 1-cinnamoyl-2-methyl-5-methoxy-3-indolylacetate hydrochloride. Mp. 187°–188° C.

β-(N⁴-Benzyl-piperazino)ethyl 1-cinnamoyl-2-methyl-5-methoxy-3-indolylacetate dihydrochloride. Mp. 188°–189° C.

β-Piperidinoethyl 1-cinnamoyl-2-methyl-5-methoxy-3-indolylacetate hydrochloride. Mp. 164°–165° C.

β-Piperidinoethyl 1-(p-chlorobenzoyl)-2-methyl-5-methoxy3-indolylacetate hydrochloride. Mp. 210°–211° C.

β-Morpholinoethyl 1-(3',4'-methylenedioxybenzoyl)-2-methyl-5-methoxy-3-indolylacetate hydrochloride. Mp. 120°C. (dec.)

β-Morpholinoethyl 1-(p-chlorobenzoyl)-2-methyl-5-methoxy-3-indolylacetate hydrochloride. Mp. 201°–202° C.

Example 3

To a solution of 10.5 g. of 1-cinnamoyl-2-methyl-5-methoxy-3-indolyl acetic acid in 80 ml. of tetrahydrofuran and 3.1 g. of triethylamine is added 3.3 g. of ethyl chloroformate at 0° C. After the reaction mixture is stirred for 0.5 hour at 0° C., 4.5 g. of β-[2'-(N-methylpiperidyl)] ethanol is added to the reaction mixture. After the reaction mixture is stirred under reflux for 2 hour the solvent is removed under reduced pressure to the residue, to which is added water and the mixture is extracted with benzene. The benzene layer is washed with water and dried over sodium sulfate.

The solvent is removed under reduced pressure to give β-[2'-(N-methylpiperidyl)] ethyl 1-cinnamoyl-2-methyl-5-methoxy-3-indolylacetate as a yellow oil. Gaseous hydrogen chloride is introduced to a solution of β-[2'-(N-methylpiperidyl)] ethyl 1-cinnamoyl-2-methyl-5-methoxy-3-indolylacetate in ether at 5° C. Deposited crystals are collected by filtration and recrystallized from ethanol to give β-[2'-(N-methylpiperidyl)] ethyl 1-cinnamoyl-2-methyl-5-methoxy-3-indolylacetate hydrochloride. Mp. 128°–129° C.

Example 4

A solution of 7 g. of 1-cinnamoyl-2-methyl-5-methoxy-3-indolyl acetic acid in 30 ml. of dimethylformamide is added to a mixture of 0.5 g. of sodium hydride and 10 ml. of dimethylformamide at 5° C. and the reaction mixture is stirred for 0.5 hour. To the reaction mixture is added 3.3 g. of γ-piperidinopropyl chloride at 5° C. and the reaction mixture is stirred for 1 hour at 50°–60° C. and then for 1 hour at 60°–70° C. and further for 1.5 hour at 70°–80° C. The reaction mixture is poured into 200 ml. of water and extracted with benzene. The benzene layer is washed with water and dried over sodium sulfate. The solvent is removed under reduced pressure to give γ-piperidinopropyl 1-cinnamoyl-2-methyl-5-methoxy-3-indolylacetate as a yellow oil. Gaseous hydrogen chloride is introduced to a solution of this oil in ether to give γ-piperidonopropyl 1-cinnamoyl-2-methyl-5-methoxy-3-indolylacetate hydrochloride. Recrystallization from ethanol gives crystals having a melting point of 144°–145° C.

Example 3

To a solution of 10.5 g. of 1-cinnamoyl-2-methyl-5-methoxy-3-indolyl acetic acid in 80 ml. of tetrahydrofuran and 3.1 g. of triethylamine is added 3.3 g. of ethyl chloroformate at 0° C. After the reaction mixture is stirred for 0.5 hour at 0° C., 5.8 g. of diethylaminoethoxyethanol is added to the reaction mixture. After the reaction mixture is stirred under reflux for 2 hours, the solvent is removed under reduced pressure. water is added to the residue and the mixture is extracted with benzene. The benzene layer is washed with water and dried over sodium sulfate. The solvent is removed under reduced pressure to give diethylaminoethoxyethyl 1-cinnamoyl-2-methyl-5-methoxy-3-indolylacetate as a yellow oil. To the oil is added 3.1 g. of citric acid monohydrate and iso-propylalcohol is added dropwise to the mixture at 60° C. until the crystals are dissolved.

After cooling, the deposited crystals are collected by filtration and recrystallized from ethanol ether to give diethylaminoethoxyethyl 1-cinnamoyl-2-methyl-5-methoxy-3-indolyl acetate citrate. Mp. 72.5°–73.5° C.

Example 6

A mixture of 6.1 g. of N¹-cinnamoyl-p-methoxy phenylhydrazine hydrochloride, 6 g. of β-N,N-diethylaminoethyl levulinate and 50 ml. of iso-propanol is stirred under reflux for 5 hours.

The solvent is removed under reduced pressure to the residue, to which is added water and the mixture is extracted with benzene. The benzene layer is washed with water and dried over sodium sulfate. The solvent is removed under reduced pressure to give β-N,N-diethylaminoethyl 1-cinnamoyl-2-methyl-5-methoxy-3-indolylacetate. Gaseous hydrogen chloride is introduced to a solution of β-N,N-diethylaminoethyl 1-cinnamoyl-2-methyl-5-methoxy-3-indolylacetate in ether. Deposited crystals are collected by filtration and recrystallized from ethanol to give β-N,N-diethylaminoethyl 1-cinnamoyl-2-methyl-5-methoxy-3-indolacetate hydrochloride. Mp. 133°–134° C.

According to the method described above, the following compounds are obtained.

β-N,N-Dimethylaminoethyl 1-(3',4'-methylenedioxybenzoyl)-2-methyl-5-methoxy-3-indolylacetate hydrochloride. Mp. 137°–138° C.

β-N,N-Dimethylaminoethyl 1-(3',4'-methylenedioxybenzoyl)-2-methyl-5-methoxy-3-indolylacetate methyl iodide. Mp. 190°–192° C.

β-N,N-Dimethylaminopropyl 1-cinnamoyl-2-methyl-5-methoxy-b 3-indolylacetate hydrochloride. Mp. 156°–157° C.

β-Dimethylaminopropyl 1-cinnamoyl-2-methyl-5-methoxy-3-indolylacetate hydrochloride. Mp. 170°–172° C.

What we claim is:

1. A 3-indolylacetate derivative represented by the formula,

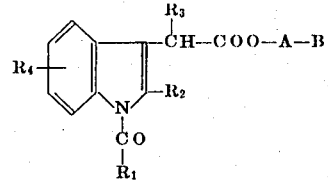

wherein $R_1$ signifies a styryl group, a phenyl group, a halogen-substituted phenyl group or a methylenedioxy phenyl group; $R_2$ and $R_3$ signify independently a hydrogen atom or a $C_1$–$C_2$ alkyl group; $R_4$ signifies a hydrogen atom, a halogen atom, a $C_1$–$C_4$ alkyl group or a $C_1$–$C_4$ alkoxy group; A signifies —$CH_2$—$CH_2$—O—$CH_2$—$CH_2$—, or —$C_nH_{2n}$— (wherein n signifies an integer of 1–6); B signifies an amino group, a $C_1$–$C_4$ alkylamino group, a di-$C_1$–$C_4$-alkylamino group, a morpholino, N-benzylpiperazino, N-methyl piperazino or piperidino group.

2. A 3-indolylacetate derivative according to claim 1 wherein the symbol A is —$CH_2$—$CH_2$— and the symbol B is morpholino, di-$C_1$–$C_4$-alkylamino, benzylpiperazino or piperidino.

3. A 3-indolylacetate derivative according to claim 1 wherein the symbol A is —$CH_2$—$CH_2$—$CH_2$— and the symbol B is di-$C_1$–$C_4$-alkylamino or morpholino.

* * * * *